Feb. 12, 1952 N. BENNETT 2,585,530
MULTIBUMPER GRILLE
Filed Dec. 2, 1948 2 SHEETS—SHEET 2
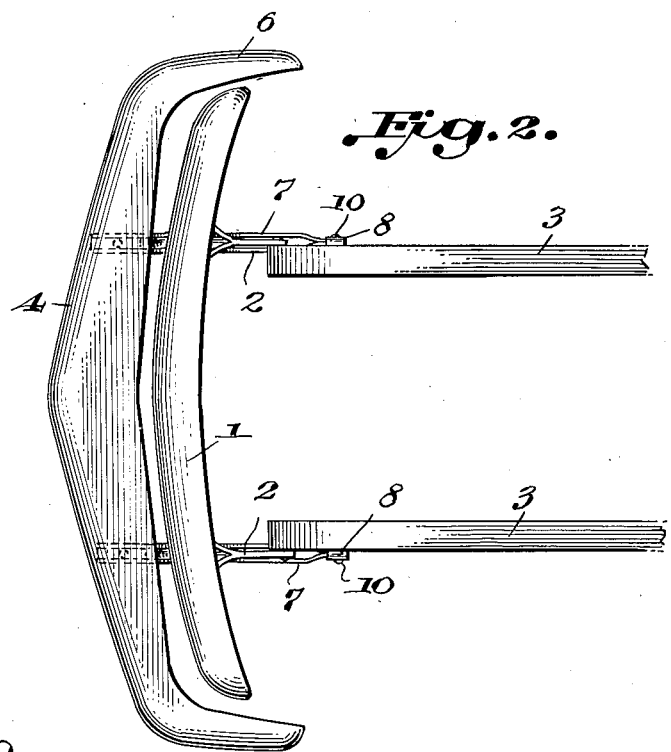
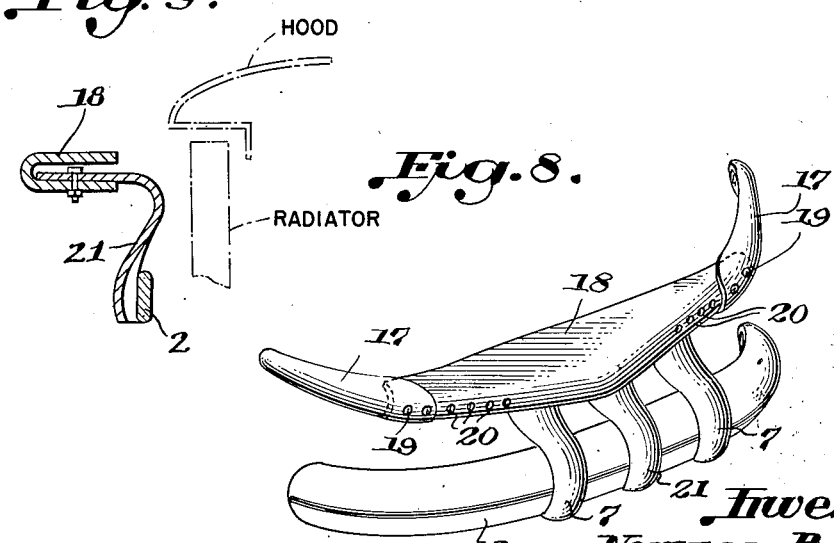
Inventor,
Norman Bennett,
By Robert C. Dennison
Atty.

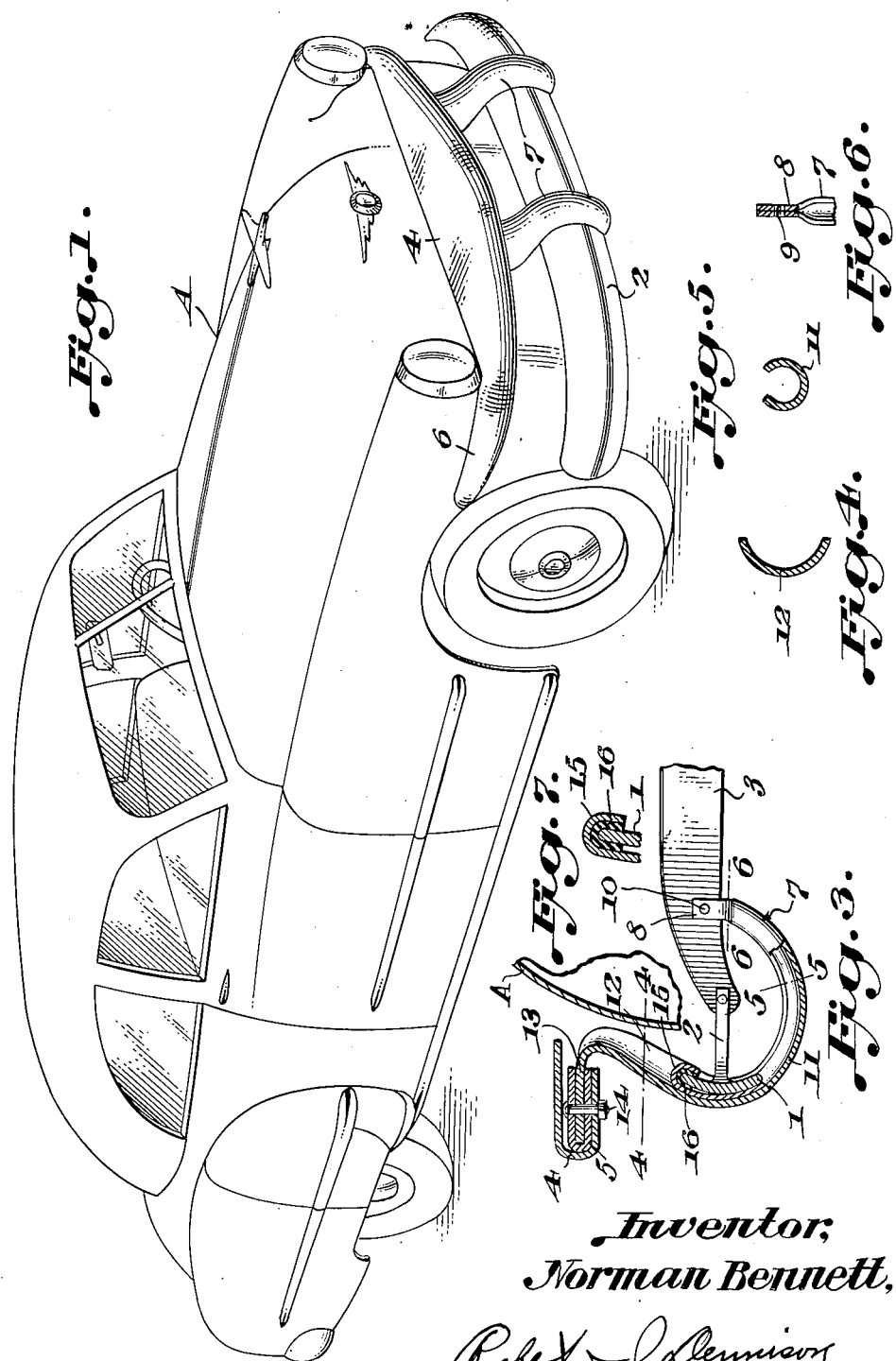

Patented Feb. 12, 1952

2,585,530

UNITED STATES PATENT OFFICE 2,585,530

MULTIBUMPER GRILLE

Norman Bennett, Washington, D. C.

Application December 2, 1948, Serial No. 63,047

7 Claims. (Cl. 293—97)

The present invention relates to improvements in automobile bumper and grille structures.

One of the important objects of the present invention resides in the provision of a structure that will eliminate the use of an expensive grille construction and includes lower and upper horizontal bumper members.

Another object of importance is to provide a new and novel grille bar structure for association with the upper and lower bumper members.

A further object is to provide an upper horizontal bumper member that is resiliently supported above and forwardly of the lower horizontal bumper member, whereby said upper bumper member will initially receive the impact.

A still further object is to provide an upper horizontal bumper member and its grille-forming supporting bars which may be readily and easily attached on the front of an automobile for association with the conventional lower bumper and this without necessitating any changes of the automobile.

Still another object is to provide a structure of the above mentioned character that will enhance the beauty and modern style of the automobile on which it is mounted.

Another object of the invention is to provide a multi-bumper grille structure which will be strong and durable, yet inexpensive and at all times positive and efficient in carrying out the purposes for which the structure is designed.

Other objects and advantages will become apparent from the following description, when taken in connection with the accompanying drawings.

In the accompanying drawings forming a part of this specification and in which like characters designate corresponding parts throughout the several views:

Figure 1 is a perspective view of an automobile showing my multi-bumper grille structure mounted thereon.

Figure 2 is a fragmentary bottom plan view showing the multi-bumper grille attached to the chassis of the automobile.

Figure 3 is a vertical sectional view through the structure, showing the manner in which the several parts work and the manner in which the structure is secured to the chassis.

Figure 4 is a transverse section through the vertical grille bar, taken approximately on the line 4—4 of Figure 3.

Figure 5 is a similar sectional view taken on the line 5—5 of Figure 3.

Figure 6 is a further transverse section through the vertical grille bar, taken on the line 6—6 of Figure 3.

Figure 7 is a detail sectional view showing the manner in which the rubber lined bracket engages over the upper edge of the lower horizontal bumper member.

Figure 8 is a perspective view of a modification of my multi-bumper grille, and

Figure 9 is a sectional view through the upper and lower horizontal bumper bars showing the manner in which the dummy vertical grille bar is associated with said bumper bars.

In the drawings, the numeral 1 designates the conventional horizontal bumper member that is supported across the front of the automobile A by the brackets 2, the inner or rear ends of which are fastened to the chassis frame 3 in the usual manner. For the purposes of the present invention, this bumper member is designated as the lower bumper member.

Forming a salient part of the present invention is the upper horizontal bumper member 4. This upper bumper member is substantially U-shaped in cross section and a reinforcing U-shaped girder 5 is secured on the inside of the bumper member 4 in any suitable manner, preferably by welding.

The upper bumper member 4 decreases gradually in width from its central portion to its outer ends, the outer end portions 6 forming side wings that are adapted to be disposed against the respective sides of the automobile fenders, in the manner as clearly shown in Figure 1.

The upper horizontal bumper member may be formed of any suitable gage metal, and by reason of the tapered formation the forward edge portions diverge from the central portion of this bumper member.

Also forming an important part of the present invention are the resilient vertical grille bars 7. These grille bars are formed of heavier metal than that from which the upper bumper member 4 is formed. Two of such grille bars are employed.

Each grille bar is of curved formation and is of various cross sectional shapes at different parts thereof. The inner lower end of each grille bar is flattened as indicated at 8 and bolt receiving openings 9 are formed in the flattened ends 8 whereby said ends may be bolted to the respective chassis frame 3 as at 10.

The intermediate portion of the grille bar is substantially rounded in cross section as indicated at 11, while the upper portion of each grille bar is only slightly curved in cross section as shown at 12 in Figure 4.

The intermediate portions of the grille bars extend vertically across the front face of the lower horizontal bumper member 1.

The upper extremity of each grille bar is flattened and is disposed laterally to provide a forwardly extending flange 13, as clearly shown in Figure 3 of the drawings.

The flange 13 projects beyond the outer face of the slightly curved portion 12 of each grille bar and is disposed within the U-shaped reinforcing girder 5. Suitable fastening means 14 extend through the U-shaped girder 5, the flanges 13 and the bottom portion of the upper bumper member 4.

In this manner, the upper horizontal bumper member 4 will be supported by the resilient vertical grille bars forwardly and appreciably above the lower horizontal bumper member 1, as also clearly illustrated in Figure 3 of the drawings.

The vertical grille bars 7 will be of such height as to support the upper horizontal bumper member 4 just below the headlights on the automobile and further, by the use of these vertical bars, the use of an expensive front grille structure can be eliminated.

A hook shaped clip 15 is carried by the interior of the slightly curved portion 12 of each grille bar and the upper end of these clips engage over the upper edge of the lower horizontal bumper member 1. A rubber liner 16 is associated with each clip to space the metal of each clip from the lower bumper member, thereby eliminating metal to metal contact.

With the parts mounted as shown, it will be apparent that the upper horizontal bumper member 4 will initially receive any impact caused as a result of a collision, before the vertical grille bars and the lower horizontal bumper member are contacted.

Further, the lower horizontal bumper member will coact with the resilient vertical grille bars to absorb the shock which may result as an outcome of the impact received by the upper horizontal bumper member.

Upon impact, the upper bumper member will move rearwardly and the vertical grille bars will flex at the contact area with the lower bumper member, the latter serving as a fulcrum. The vertical grille bars will slide slightly upward over the outer face of the lower bumper member and impart a compressive force to the lower bumper member supporting brackets.

Thus, my multi-bumper grille structure will afford the maximum amount of protection for the front of the automobile.

By reason of the tapering front structure of the upper horizontal bumper member, the same will have a tendency to cause the colliding blow to glance off to the side.

If desired, the side wings may be braced by attaching brace rods thereto and such brace rods can be secured to the chassis or to the underside of the respective fender.

In Figure 8 I have shown a modification of the structure, wherein, instead of forming the side wings of the upper horizontal bumper member integral with the body portion thereof, the side wings 17 are separate units and may be detachably connected to the respective ends of the bumper member 18 by suitable fastening elements 19.

A series of spaced openings 20 are formed in the end portions of the bumper member 18 to permit adjustment of the side wings 17 depending on the width of the hood and fenders of the automobile.

Also, if desired, one or more dummy vertical grille bars 21 may be secured between the upper and lower horizontal bumper members in any suitable manner.

As shown in Figure 9, the dummy vertical grille bar 21 is secured at its upper end to the upper horizontal bumper 18 by a bolt. The dummy vertical grille bar is of substantially the same shape as the vertical grille bars 7, except that the lower end of the dummy grille bar terminates adjacent the lower edge of the lower horizontal bumper 2. The lower portion of the dummy grille bar bears against the front face of the lower bumper.

The vertical grille bars will compress the lower horizontal bumper upon an impact being received by the upper horizontal bumper.

The channel-shaped upper bumper member will form an air scoop and may also serve as a support for auxiliary lights.

While I have shown the preferred embodiment of my invention, it is to be understood that various changes in the size, shape and arrangement of parts may be resorted to without departing from the spirit of the invention and the scope of the appended claims.

Having thus described my invention, what I claim is:

1. In combination with an automobile having a lower horizontal bumper, an upper horizontal bumper for disposition directly below the headlights of the automobile, substantially resilient vertical grille bars connected at their lower ends to the chassis of the automobile and at their upper ends to the upper horizontal bumper, said vertical grille bars having their intermediate portions extending across the front face of the lower horizontal bumper and at all times in frictional engagement therewith, and clamping means carried by the vertical grille bars for engagement with the lower bumper, said clamping means being readily disengageable from the lower bumper upon impact being received by the upper horizontal bumper.

2. In combination with an automobile having a lower horizontal bumper, a pair of substantially resilient vertical grille bars connected at their lower ends to the respective sides of the chassis of the automobile, the intermediate portions of said grille bars extending cross the front face of the lower horizontal bumper and at all times in frictional engagement therewith, an upper horizontal bumper supported on the upper ends of the grille bars forwardly of said lower horizontal bumper, and clips carried by the vertical grille bars for engagement over the upper edge of the lower bumper, said clips being readily disengageable from the lower bumper upon impact being received by the upper horizontal bumper.

3. In combination with an automobile having a lower horizontal bumper, a pair of curved substantially resilient vertically disposed grille bars connected at their lower ends to the respective sides of the chassis of the automobile, the intermediate portions of the grille bars being curved around and extending across the front face of the lower bumper and at all times in frictional engagement therewith, forwardly extending flanges formed on the upper ends of the grille bars, and a channel-shaped upper horizontal bumper secured to said flanges, whereby the upper bumper will be mounted forwardly of the lower bumper, and means for supporting the vertical grille bars on the lower bumper.

4. In combination with an automobile having a lower horizontal bumper, a pair of curved substantially resilient vertically disposed grille bars connected at their lower ends to the respective sides of the chassis of the automobile, the intermediate portions of the grille bars being curved around and extending across the front face of the lower bumper and at all times in frictional engagement therewith, forwardly extending flanges formed on the upper ends of the grille bars, a channel-shaped upper horizontal bumper secured to said flanges, whereby the upper bumper will be mounted forwardly of the lower bumper, clips carried by the vertical grille bars for engagement over the upper edge of the lower bumper, and wings extending rearwardly from the ends of the upper bumper for disposition against the respective sides of the fenders of the automobile, the upper horizontal bumper being disposed directly below the headlights of the automobile, said clips being readily disengageable from the lower bumper upon impact being received by the upper horizontal bumper.

5. In combination with an automobile having a lower horizontal bumper, an upper horizontal bumper for disposition directly below the headlights of the automobile, and substantially resilient vertical grille bars connected at their lower ends to the chassis of the automobile and at their upper ends to the upper horizontal bumper, said vertical grille bars having their intermediate portions extending across the front face of the lower bumper and at all times in frictional engagement therewith to compress the lower horizontal bumper upon impact being received by the upper horizontal bumper, and means for supporting the vertical grille bars on the lower bumper.

6. In combination with an automobile having a lower horizontal bumper, a pair of substantially resilient grille bars connected at their lower ends to the respective sides of the chassis of the automobile, the intermediate portions of said grille bars being curved and extending across the front face of the lower bumper and at all times in frictional engagement therewith to compress the lower horizontal bumper upon impact being received by the upper horizontal bumper, the upper ends of the grille bars being disposed horizontally and forwardly, and an upper horizontal bumper supported on the upper ends of the grille bars and disposed forwardly of the lower horizontal bumper, and means for supporting the vertical grille bars on the lower bumper.

7. In combination with an automobile having a lower horizontal bumper, an upper horizontal bumper for disposition directly below the headlights of the automobile, substantially resilient vertical grille bars connected at their lower ends to the chassis of the automobile and at their upper ends to the upper horizontal bumper, said vertical grille bars having their intermediate portions extending across the front face of the lower bumper and at all times in frictional engagement therewith to compress the lower horizontal bumper upon impact being received by the upper horizontal bumper, and a dummy vertical grille bar extending between the upper and lower horizontal bumpers and arranged between the aforementioned vertical grille bars, the lower portion of the dummy grille bar extending across the front face of the lower bumper, and means for supporting the vertical grille bars on the lower bumper.

NORMAN BENNETT.

REFERENCES CITED

The following references are of record in the file of this patent:

UNITED STATES PATENTS

| Number | Name | Date |
|---|---|---|
| 1,515,565 | Finnegan | Nov. 11, 1924 |
| 1,586,028 | Crawford-Frost | May 25, 1926 |
| 1,610,516 | Harvey | Dec. 14, 1926 |
| 2,191,751 | Cataldo | Feb. 27, 1940 |
| 2,261,377 | Jandus | Nov. 4, 1941 |
| 2,270,533 | Knutte | Jan. 20, 1942 |
| 2,281,215 | Van Auken | Apr. 28, 1942 |
| 2,342,907 | Stall | Feb. 29, 1944 |
| 2,358,663 | Scott et al. | Sept. 19, 1944 |